United States Patent
Weber

(10) Patent No.: US 7,493,404 B2
(45) Date of Patent: Feb. 17, 2009

(54) APPARATUS AND METHOD FOR PROVIDING TRANSPARENT SHARING OF CHANNEL RESOURCES BY MULTIPLE HOST MACHINES UTILIZING MIXED MODE BLOCK AND FILE PROTOCOLS

(75) Inventor: Bret S. Weber, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 1010 days.

(21) Appl. No.: 10/198,684

(22) Filed: Jul. 18, 2002

(65) Prior Publication Data

US 2003/0225735 A1   Dec. 4, 2003

Related U.S. Application Data

(63) Continuation-in-part of application No. 10/158,477, filed on May 30, 2002, now Pat. No. 7,080,190.

(51) Int. Cl.
*G06F 15/16*   (2006.01)
*G06F 13/12*   (2006.01)

(52) U.S. Cl. .................. 709/230; 709/232; 710/62; 710/65

(58) Field of Classification Search .......... 710/29, 710/33, 64, 65, 74, 261, 315, 62; 709/230, 709/232
See application file for complete search history.

(56) References Cited

U.S. PATENT DOCUMENTS

| | | | | |
|---|---|---|---|---|
| 6,779,063 | B2 * | 8/2004 | Yamamoto | 710/74 |
| 6,789,152 | B2 * | 9/2004 | Hoese et al. | 710/305 |
| 2002/0178143 | A1 * | 11/2002 | Fujimoto | 707/1 |
| 2004/0233910 | A1 * | 11/2004 | Chen et al. | 370/395.5 |

FOREIGN PATENT DOCUMENTS

EP      1100001 A2 *   5/2001

* cited by examiner

*Primary Examiner*—Niketa I Patel
*Assistant Examiner*—Richard Franklin
(74) *Attorney, Agent, or Firm*—Suiter Swantz PC LLO

(57) ABSTRACT

The present invention is directed to a method and system for providing, transparent mixed mode, object and block data storage transport. The system implements I/O modules capable of translating between communication protocols for providing common message passing multi-channel data transport for data storage while providing apparent I/O circuit exclusivity to controllers. The system is capable of converting object based transports for block storage, thus permitting both block and object based access to the storage complex. Implementing the system of the present invention allows for a common data transport system permitting component scalability and virtualization while allowing for target and initiator mode utilization of I/O interface circuits.

30 Claims, 2 Drawing Sheets

APPARATUS AND METHOD FOR PROVIDING TRANSPARENT SHARING OF CHANNEL RESOURCES BY MULTIPLE HOST MACHINES UTILIZING MIXED MODE BLOCK AND FILE PROTOCOLS

CROSS REFERENCE

The present application is a continuation-in-part and claims priority to U.S. patent application Ser. No. 10/158,477, entitled: APPARATUS AND METHOD FOR PROVIDING TRANSPARENT SHARING OF CHANNEL RESOURCES BY MULTIPLE HOST MACHINES, filed on May 30, 2002 now U.S. Pat. No. 7,080,190, which is hereby incorporated in its entirety.

FIELD OF THE INVENTION

The present invention generally relates to the field of data storage and particularly to a method and system for providing transparent mixed mode data transport in a storage complex.

BACKGROUND OF THE INVENTION

Data storage networks present many architectural challenges and have several key requirements such as compatible data communication and scalability. Presently, storage system are typically either storage area networks (SAN) or network-attached storage (NAS). The principle difference between the competing systems is the level of control over data in the storage system.

For example, in a SAN environment file level management is conducted on the host system, thus data in the SAN is manipulated in accordance with block protocols or block-level interface. Block protocols transport the data as components of a particular file which are assembled or converted into a file at the host device. Therefore, a host system requesting a particular file actually requests the blocks of data forming the file from the data storage system. Upon receipt of the block components, the data is converted by the host to the desired file. This places a burden on processors associated with the host machine. Additionally, since data within a SAN is managed on a block level, meta-data such as permissions, creation data, user authentication and the like are not associated directly with the data.

NAS systems employ an object or file transport structure or file-level interface. For example, should a host device wish to store data, the file to be stored is transferred to the storage system which then manipulates the file into blocks of data which are stored in the physical storage devices. NAS systems permit the data to be treated on an object or a file level thus meta-data such as permissions, creation data, user authentication associated with the file may be utilized.

SAN systems require host devices capable of integrating into the SAN block-level interface architecture. NAS systems permit greater access to a wide variety of host devices since host devices transfer files for storage instead of data blocks as required by SAN systems. Therefore NAS file-level interface systems provide greater access to a wide variety of host system/applications.

SAN systems on the other hand, permit scaling, and higher data capacity over that of a typical NAS system.

Therefore, it would be desirable to provide a method and system for implementing transparent mixed mode data transport and resource sharing.

SUMMARY OF THE INVENTION

Accordingly, the present invention is directed to a method and system capable of providing transparent common message passing data storage transport in a mixed mode environment, such as object and block based protocols.

A storage complex system of the present invention implements I/O modules and controller elements including circuits capable of translating to permit common message passing for providing transparent mixed mode data transport. An object converting element, included in the system, is capable of converting between file based message passing while implementing its file system on the block based storage complex components, thereby allowing for transport of object based requests.

A method for providing mixed mode data storage transport includes receiving the host commands and data requests for access. The received host command and data is interpreted. Interpreting includes translating the data into common block storage message and determining if the host request is an object request. If the request is an object, the request is routed to an object converting element for conversion. Data forming the requested object is assembled into the object and subsequently transferred to the requesting I/O channel for transport to the requesting host device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
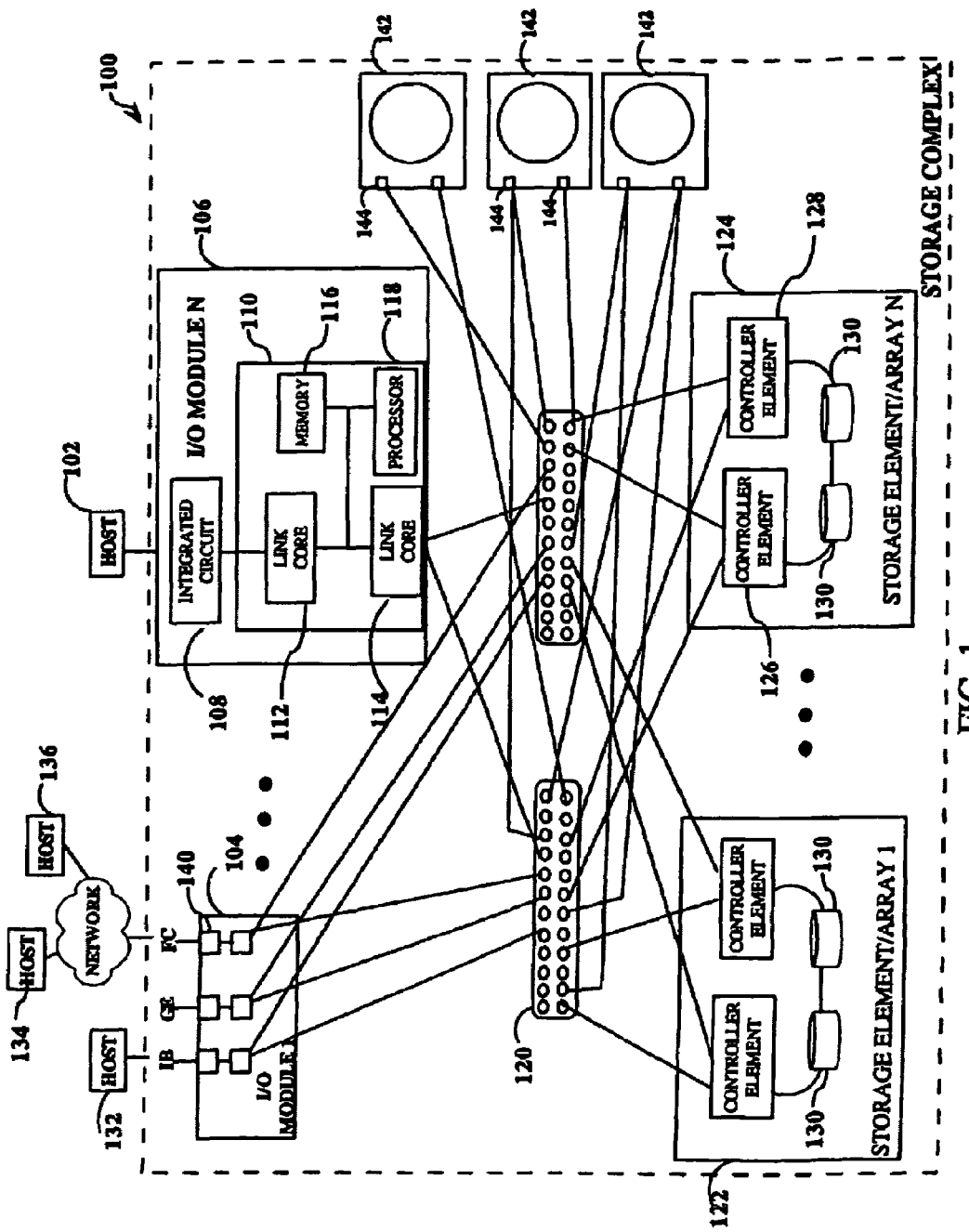
FIG. 1 is an illustration of a storage complex system including object routing elements capable of mixed mode data transport.

Referring to FIG. 1, an embodiment of the present invention is shown wherein a storage complex system 100 for common message passing mixed mode block or object based data transport. The present invention allows for transparent mapped mixed mode data transport over an internal switched fabric link, thus providing scalability and common message passing while providing apparent exclusivity for controllers. Implementation of the system of the present invention permits external devices such as host devices to view the storage complex system as a virtual single storage device.

Included in the system 100 are I/O modules. In the current embodiment I/O modules 1 104 through "N" 106 are shown. It is to be understood that the storage complex of the present invention is scalable with respect to storage complex components. The present invention further allows for scalability with respect to host devices and/or host device networks. I/O modules included in the storage complex system 100 may be coupled either directly or via a network to a host device or a plurality of host devices depending on the implementation. Host devices 102 include servers, information handling systems and the like.

A host interface I/O circuit 108 is included in the I/O module. I/O circuits are suitable for block or object based data transport with a host device or multiple host devices utilizing a common block or object based protocol over the physical connection. Suitable block protocols include SCSI Remote DMA Protocol (SRP) over a highspeed computer bus compliant with InfiniBand, sold under the trademark INFINIBAND, architecture (IB), Small Computer System Interface over TCP/IP (iSCSI) over Ethernet, Fibre Channel Protocol (FCP) over Fibre Channel (FC), and the like. For example, I/O circuit 108 implements FCP over FC for communication with a host device 102. In a second example, an I/O circuit utilizing SRP over IB communicates with a host device 132. In a third example an I/O circuit 140 communicates via a FC fabric with host devices 134 and 136 utilizing FCP over FC.

Suitable object based protocols include direct access file system (DAFS) over INFINIBAND, network file system (NFS) over Ethernet, server message block (SMB) over common internet file system (CIFS) and the like. It will be apparent to those of skill in the art that various block or object protocols and physical connections may be implemented without departing from the scope and spirit of the present invention.

Block data transfers in target mode to these I/O circuits 108 typically use a vendor unique message passing scheme that consists of a microprocessor pre-posting command buffers to the I/O circuit 108 on initialization. Command buffers specify an area in microprocessor memory where an incoming block storage command from a host device is deposited by the I/O circuit 108. The I/O circuit 108 vendor unique message passing scheme also has a mechanism to allow a microprocessor to specify a data transfer message indicating to the I/O circuit 108 where in memory to get/put the data (scatter gather list), as well as the direction of the data flow. The block message passing scheme allows the microprocessor the ability to specify a completion message after the data transfer is complete that indicates that the entire I/O command has completed. The I/O circuit functions generally to convert from this I/O chip specific message passing scheme to a physical interface such as Fibre Channel, and a standard I/O storage protocol such as FCP. It is also noted that there are I/O circuits which are unintelligent, in which, a microprocessor must discretely implement the I/O protocol by way of a specific driver.

An application specific integrated circuit (ASIC) 110 is included in the I/O module "N" 106. The ASIC 110 functions to translate generally between the external protocol implemented by the host and I/O circuit 108 and the common message passing protocol implemented internally in the storage complex 100. When an ASIC 110 receives an object based transport, the object transport is directed to an object converting element 142, such as a network attached storage (NAS) head-end server.

Moreover, the I/O module ASICs of the present invention are capable of providing masking and funneling to interface I/O circuits. The ASIC of the present invention is suitable for emulating data transfers for the associated I/O circuit. Block based transport translation and routing may be based on host world wide name, a unique host identifier, logical unit number and the like. In embodiments of the present invention, the ASIC is capable of virtualization of block data storage such as striping, and logical unit number concatenation as well as virtualization of hosts, ports, LUNS and volumes. Striping includes interleaving data to multiple controller elements and concatenation includes filling a portion of data on one controller element and then moving to another controller element, such that multiple separate volumes on multiple controller elements appear to a host as a single logical unit.

At least one link core is included in the I/O module ASIC 110. Link cores are suitable for communication in compliance with INFINIBAND architecture (IB), Gigabit Ethernet (GE), Fibre Channel (FC), Peripheral Component Interconnect (PCI), a serial physical-layer communications protocol sold under the trademark PERIPHERAL COMPONENT INTERCONNECT EXPRESS architecture, a local bus protocol sold under the trademark PERIPHERIAL COMPONENT INTERCONNECT EXTENDED architecture and the like. For example, I/O module ASIC 106 includes a first link core 112 suitable for utilization in compliance with PERIPHERAL COMPONENT INTERCONNECT EXPRESS to communicate with the I/O circuit 108 and host 102 associated with I/O module N 106 and a second link core 114 compliant at least minimally with INFINIBAND architecture, when the storage complex utilizes INFINIBAND architecture. It will be apparent that transactions occurring over link cores of the storage complex 100 may be compliant with other protocols or some level of compliance as contemplated by one of ordinary skill in the art without departing from the spirit and scope of the present invention.

A processor 118 is coupled to the first and second link cores 112 and 114. For example in the present embodiment an ARM (Advanced RISC Machine) core type processor 118 is implemented. In additional embodiments, other processors are implemented. The processor 118 is suitable for translating messages between the first and second link cores 112 and 114, wherein translation is based on at least one of host world wide name, a unique host identifier and logical unit number.

A memory 116 coupled to the processor 118 is suitable for processor code storage and execution; buffering data transports; as well as storing commands such as from pre-posted command buffers, or command pool routing function providing a routing table. Buffering may include buffering data as well as object/block read/write commands and the like. Routing tables may include host world wide name, logical unit number (LUN), unique host identifiers, controller element identifiers for directing data transports though the storage complex 100. For example, at initialization processors from each controller element 126 & 128 pre-post command buffers to each I/O module ASIC which is discovered. For example, I/O module ASIC for I/O modules 1 though "N". Each controller element processor independently discover each I/O module ASIC in the storage complex system. Routing tables that are contained in each ASIC are then configured to determine which controller element host commands are to be routed. In further implementations of the present invention, commands may reside either in part or in whole on the processor such as firmware as well and it is the intention to encompass and include such changes as contemplated by one of ordinary skill in the art. Further it will be appreciated that components included in the ASIC may be implemented as independent external components such as to allow for upgrades and the like.

Two switches 120 are included in the system 100. The switches 120 are coupled to a link core 114 of the module ASIC 110. The switches 120 are suitable for communication in compliance with INFINIBAND architecture communication protocol. The second link core 114 of the I/O module ASIC 110, coupled to each of the switches, is INFINIBAND compliant and may allow tunneling PCI or PERIPHERAL COMPONENT INTERCONNECT EXPRESS through INFINIBAND for increased transparency. In further embodiments other communication protocols are implemented as contemplated by one of ordinary skill in the art. Each switch is capable of propagating data including providing mirrored data to storage elements.

Object converting elements 142, such as network attached head-end servers (NAS engines) are included in the storage complex system 100. The object converting elements 142 are coupled to the switch 120. Object converting elements 142 are capable of converting object based transports into block based transports.

In further embodiments, overall storage complex software may be utilized for load-balancing between multiple object converting elements as well as overall management of the storage complex, such as transparently manipulating data throughout the system. For example, overall storage complex managing software sold under the trademark SANTRICITY™ software (LSI Logic, Incorporated).

For example, a host object command is routed to a object converting element 142. The converting element 142 in-turn requests the block data forming the requested file from controller elements associated with the physical data storage devices 130. Data forming the object or file may be stored within a particular storage device or a set of storage devices 130. The converting element 142 assembles the requested data from the storage devices 130 into the desired file for transport to the requesting host via the requesting I/O channel. In a further example, the I/O module ASIC routes an object based data storage transport to a converting element 142. The converting element 142 converts the data to block based protocol which are subsequently transported to the storage element controller elements for storage in associated devices.

The object converting element 142 may utilize ASICs 144 as are described generally with regard to the I/O module ASICs 110. In application in which ASIC 144 is implemented into an object converting element 142 to couple the object converting element 142 to the switch 120, the ASIC processor may not be included, such as when the object converting element ASIC 144 is utilized for transporting intra-complex block messages.

Storage elements are individually coupled to each switch 120. Storage element one 122 through N 124 are shown. It is to be understood that the present invention is scalable with respect to storage elements.

Controller elements are included in each of the storage elements. Referring to storage element "N" 124, two controller elements 126 and 128 are included. Including at least two controller elements allows for write cache enablement.

Included in each storage element are a plurality of storage devices 130. Storage devices include hard drives, tape drives, optical storage devices, magnetic-optical devices, and the like. Optical storage devices may include CD-ROM, CD-R, DVD and the like. Various combinations/arrangements of devices including various RAID configurations may be desirable and it is within the spirit and scope of the present invention to include these combinations and arrangements. For example, storage element 122 may contain storage devices suited for high I/O operations while storage element 124 may contain storage devices designed for high bandwidth. Correspondingly, pre-mapped transfers may target specific storage elements/storage devices customized for desired capabilities. In additional embodiments, storage devices may be external to the storage element, such as to facilitate upgrades and the like.

Controller elements additionally may utilize I/O modules, such as 106 to initiate external operations, such as remote mirroring or utilizing back-up drives external to the storage complex 100. The I/O interface circuit 108 may be utilized in either a target or initiator mode depending on the situation.

Figure 2:
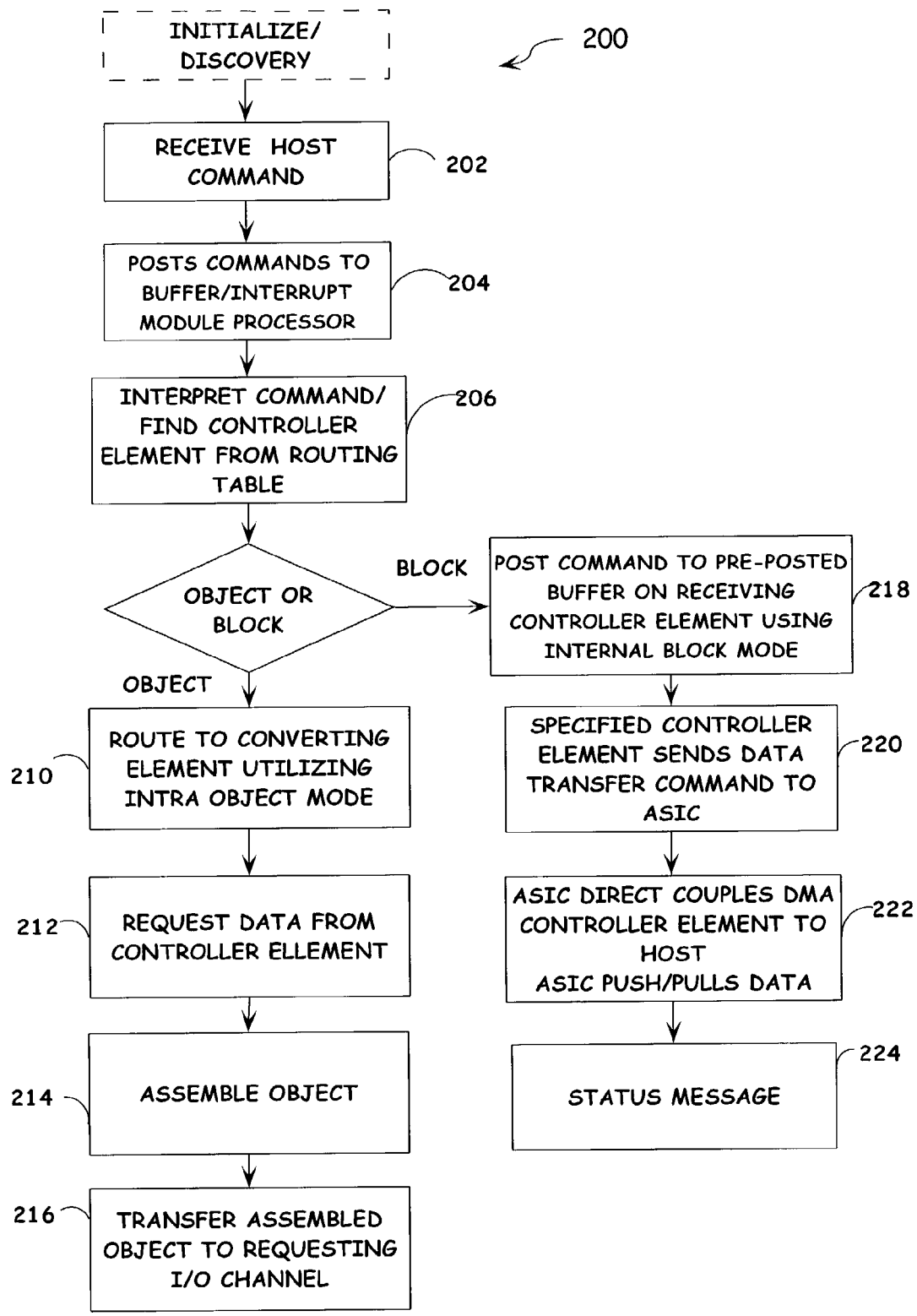
FIG. 2 is a flow diagram of a method for providing common message passing data transport.

Referring to FIG. 2, a method 200 for providing transparent mixed mode data storage transport is discussed. An I/O module associated with an I/O interface is connected to one or multiple host devices, either direct or via a storage area network. Initially, on power up, the controller elements discover the I/O module ASICs, and set up routing tables and pre-posted command buffers to the ASIC. The ASIC in turn, preposts command buffers to the I/O circuit. During normal operation, commands are received from the host device 202 via a I/O circuit, commands may include object and block read/write commands.

Upon receiving host commands the I/O circuit direct memory accesses to the pre-posted buffer and interrupts the I/O module ASIC processor 204. For example, with regard to the system 100 as discussed with respect to FIG. 1, the host 102 sends a read command via I/O circuit 108 to the ASIC processor 118 and associated memory 116.

A processor implementing the present method interprets the command 206. Interpreting includes translating into a common block message passing and a common object message passing interface where translation is based on at least one of host world wide name, unique host identifier, and LUN for block commands. For object based protocols, translation may be customized object command messages depending on the amount of object assist that is required for the protocol/physical connection. For example, the processor utilizing routing data determines the controller element pointed to by the host/LUN combination for the desired data and the like. In another example, when a block write command is received the ASIC may implement the routing function by way of a linear search engine. Additionally, interpretation 206 includes determining if the command is an object command.

If the command is an object command the command and data is routed 210 to an object converting element using object mode passing interface. In instances where multiple object converting elements implementing the present method exist, overall complex storage system software may load balance object requests to lightly loaded object converting elements, thus object requests and data may be routed to lightly utilized converting elements to increase overall efficiency, such as when converting elements implement distributive or clustered common file system.

For an object read command, data forming the file is requested 212 from the controller elements and associated physical storage devices by way of intra complex block mode traffic. Upon receipt of the requested data forming the object the data blocks are assembled 214 into the desired object or file. Once assembled the object is transferred to the requesting I/O channel 216 for transport to the requesting host device by way of the object mode message passing interface.

If the interpreted command is a block command, the command is written to the pre-posted buffer area 218 utilizing block mode message passing. The controller element is interrupted and processes the command.

For block transfers, a data transfer message 220 is sent to the I/O module ASIC by the controller element by way of the common block protocol. For a block read command the controller element obtains the data from the particular storage device. For a block write command data is transferred to the controller element for the particular storage device for buffering/writing.

Block data is then transferred data from/to the host by way of directly coupled direct memory access (DMA) to/from a controller element data transfer memory 222. For example, a processor, such as the I/O module processor 118, FIG. 1 implementing the steps of the present method posts a send DMA operation to the I/O interface circuit, such as I/O circuit 108 described in FIG. 1. The I/O circuit subsequently sends either an auto reply to the host, or a reply specified by the controller element. Upon completion an I/O circuit implementing the current method interrupts the I/O module ASIC processor, and provides an operation complete status message 224, which is then sent back to the appropriate controller element by way of a completion message.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc.

It is believed that the system and method for providing transparent switched fabric data storage transport of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for transparent mixed mode data storage transport, comprising:
   an input/output module coupled to a host device for translation of transported data;
   an object converting element capable of converting between object data transports and block data storage transports;
   a switch suitable for propagating data; and
   a storage element capable of providing data storage, the storage element being coupled to the switch, the storage element including:
      a controller coupled to the switch and coupled to a plurality of storage devices for controlling access to stored data;
   wherein the system supports transporting object and block based data storage transport, and wherein the storage element is capable of storing both object based data and block based data.

2. The system for transparent mixed mode data storage transport of claim 1, wherein the input/output module further comprises:
   a link core for implementing a common communication protocol;
   a module memory suitable for utilization in data storage message transport, coupled to the link core; and
   a processor suitable for data handling, coupled to the module memory and the link core;
   wherein the module is capable of translating between at least two communication protocols.

3. The system for transparent mixed mode data storage transport of claim 1, wherein the input/output module routes object data transports to the object converting element.

4. The system for transparent mixed mode data storage transport of claim 1, wherein the object converting element is a network attached storage head-end server.

5. The system for transparent mixed mode data storage transport of claim 4, wherein the network attached storage head-end server includes a cache for storing file data.

6. The system for transparent mixed mode data storage transport of claim 1, wherein the system load balances the object converting element.

7. The system for transparent mixed mode data storage transport of claim 1, wherein the object converting element further includes a circuit for coupling the object converting element to the switch.

8. The system for transparent mixed mode data storage transport of claim 7, wherein the object converting element circuit includes:
   a link core capable of implementing common block storage messaging;
   a memory suitable for utilization in data storage message transport; and
   a processor capable of translating between the object converting element and the common block storage messaging;
   wherein the object converting element circuit implements a common block level storage interface and a file level message passing interface.

9. The system for transparent mixed mode data storage transport of claim 1, wherein the system accepts small computer system inter-face remote direct memory access protocol (SRP) block requests and direct access file system (DAFS) file requests.

10. The system for transparent mixed mode data storage transport of claim 1, wherein the system is at least minimally compliant with a serial physical-layer communications protocol.

11. The system for transparent mixed mode data storage transport of claim 1, wherein the system is at least minimally compliant with a point-to-point high-speed switch fabric interconnect architecture.

12. The system for transparent mixed mode data storage transport of claim 1, wherein the system accepts network file system (NFS) file requests and small computer system interface over transmission control protocol/internet protocol (iSCSI) block requests.

13. The system for transparent mixed mode data storage transport of claim 1, wherein the controller initiates external data transports.

14. The system for transparent mixed mode data storage transport of claim 1, wherein the input/output module includes an interface circuit operating in conformance with at least one of target and initiator mode.

15. A system for transparent mixed mode data storage transport, comprising:
an input/output module coupled to a host device for translation of transported data;
a network attached storage head-end server capable of converting between object data transports and block data storage transports;
a switch suitable for propagating data; and
a storage element capable of providing data storage, the storage element being coupled to the switch, the storage element including:
a controller coupled to the switch and coupled to a plurality of storage devices for controlling access to stored data;
wherein the system supports transporting object and block based data storage transport, and
wherein the storage element is capable of storing both object based data and block based data.

16. The system for transparent mixed mode data storage transport of claim 15, wherein the input/output module routes object data transports to the head-end server.

17. The system for transparent mixed mode data storage transport of claim 15, wherein the network attached storage head-end server includes a cache for storing file level data.

18. The system for transparent mixed mode data storage transport of claim 15, wherein the system load balances the head-end server.

19. The system for transparent mixed mode data storage transport of claim 15, wherein the head-end server further includes a circuit for coupling to the switch.

20. The system for transparent mixed mode data storage transport of claim 15, wherein the system accepts small computer system interface remote direct memory access protocol (SRP) block requests and direct access file system (DAFS) file requests.

21. The system for transparent mixed mode data storage transport of claim 15, wherein the system is at least minimally compliant with a serial physical-layer communications protocol.

22. The system for transparent mixed mode data storage transport of claim 15, wherein the system is at least minimally compliant with a point-to-point high-speed switch fabric interconnect architecture.

23. The system for transparent mixed mode data storage transport of claim 15, wherein the system accepts network file system (NFS) file requests and small computer system interface over transmission control protocol/internet protocol (iSCSI) block requests.

24. The system for transparent mixed mode data storage transport of claim 15, wherein the input/output module includes an interface circuit operates in conformance with at least one of target and initiator mode.

25. A system for transparent mixed mode data storage transport, comprising:
means for translating received data transports;
means for converting object data transports to block data transports;
means for propagating data transports connected to the translation means and the converting means; and
means for controlling data storage access, coupled to the propagating means being coupled to a plurality of storage devices;
wherein the system supports transport of object and block based data storage transport, and
wherein each of the plurality of storage devices is capable of storing both object based data and block based data.

26. The system for transparent mixed mode data storage transport of claim 25, wherein the converting means is a network attached storage head-end server.

27. The system for transparent mixed mode data storage transport of claim 25, wherein the translating means operates in conformance with at least one of target and initiator mode.

28. The system for transparent mixed mode data storage transport of claim 25, wherein the system accepts small computer system interface remote direct memory access protocol (SRP) block requests and direct access file system (DAFS) file requests.

29. The system for transparent mixed mode data storage transport of claim 25, wherein the system accepts network file system (NFS) file requests and small computer system interface over transmission control protocol/internet protocol (iSCSI) block requests.

30. A method for providing transparent mixed mode data storage transport, comprising:
receiving a host commands and data requests for access to a storage complex from a requesting host;
interpreting the received host command and data requests by a processor, including translating data into a common block storage message, if the received request is a block data request, and determining if the received host request is an object request;
routing the determined request to an object converting element, if the request is an object request;
converting the request by the object converting element if the request is an object request;
assembling the block data into the requested object, if the request is an object request;
transferring desired data to the requesting host.

* * * * *